United States Patent [19]

Chung-Shan

[11] Patent Number: 5,123,445
[45] Date of Patent: Jun. 23, 1992

[54] WATER TAP

[76] Inventor: Sheen, Chung-Shan, No. 34, Heh Ping Road, Hu Wei Cheh, Yun Lin Hsuan, Taiwan

[21] Appl. No.: 708,865

[22] Filed: May 31, 1991

[51] Int. Cl.$^5$ .................... F16K 1/02; F16K 31/50; F16K 15/18
[52] U.S. Cl. .................... 137/606; 137/801; 251/83; 251/268
[58] Field of Search .................. 137/606, 801; 251/82, 251/83, 266, 267, 268

[56] References Cited

U.S. PATENT DOCUMENTS

| | | | |
|---|---|---|---|
| 923,808 | 6/1909 | Breth et al. | 251/83 |
| 3,044,707 | 7/1962 | Bayer | 137/606 |
| 4,217,931 | 8/1980 | Jaekel | 137/606 |
| 4,468,001 | 8/1984 | Stanic | 251/268 |
| 4,778,149 | 10/1988 | Pesovic et al. | 251/268 |

FOREIGN PATENT DOCUMENTS

| | | | |
|---|---|---|---|
| 0071001 | 4/1977 | Australia | 137/801 |
| 1181701 | 2/1970 | United Kingdom | 137/606 |

*Primary Examiner*—George L. Walton

[57] ABSTRACT

A water faucet structure comprising a hollow housing having hot and cold water inlets and a water outlet, a pair of setting valves therein, and a spout tube with one end connected to the water outlet and the other end thereof containing an egress valve. The hot and cold water inlets are in communication with a mixing chamber formed within the housing via respective setting valves wherein hot and cold water are combined in predetermined proportions before issuing from the spout tube. Each setting valve comprises a valve body having a stem and a piston, a sliding element slidingly secured to a fixed retaining element, and a rotatable positioning element threadedly engaged with one end of the sliding element. The valve stem is slidingly positioned within an axial cavity on an opposite end of the sliding element with the valve piston urged against a corresponding valve seat formed within the housing by a spring. Rotation of the positioning element effects the displacement of the sliding element which acts as a stop for the valve piston when in a open position to control the flow of water through the valve. The action of the springs closes the setting valves when the egress valve is in a closed state preventing backflow of water in the inlets.

7 Claims, 7 Drawing Sheets

PRIOR ART

FIG. 1

PRIOR ART

WATER TAP

BACKGROUND OF THE PRESENT INVENTION

The present invention relates to water faucets, and more particularly to a mixing water faucet structure that is presettable for selected proportions of hot and cold water and which prevents the backflow of water between the hot and cold water inlets thereof.

Presettable mixing faucets generally include a pair of separate setting valves for controlling the flow of hot and cold water, and an egress valve upstream therefrom which combines the hot and cold water into an efflux of desired temperature.

Substantial advantages are afforded over more conventional water faucets wherein the outflow of hot and cold water from corresponding valves is communicated directly to an egress spout without further control. Foremost of which, as the presettable type mixing faucet allows the prior adjustment of the setting valves for delivery of a hot and cold water mixture of desired proportion, a user would only have to actuate the egress valve which usually is of the on/off type to obtain an efflux of desired rate and temperature. Whereas, the conventional mixing faucet as described would require separate opening and adjustment of the hot and cold water valves therein upon each usage. Greater convenience and economy of time is thus achieved, especially in those applications best satisfied by a flow of constant rate and temperature, such as in a shower stall, flush tank, or plant irrigation system.

Furthermore, as only the egress valve needs to be actuated in the present type of mixing faucet to obtain emission, the rate of wear in the setting valves would accordingly be reduced in comparison with the corresponding hot and cold water valves in the conventional mixing faucet which would necessitate operation upon each occurence. Should the egress valve be of the on/off type the reliability of the system would be further increased due to their inherently greater sturdiness.

Figure 1:
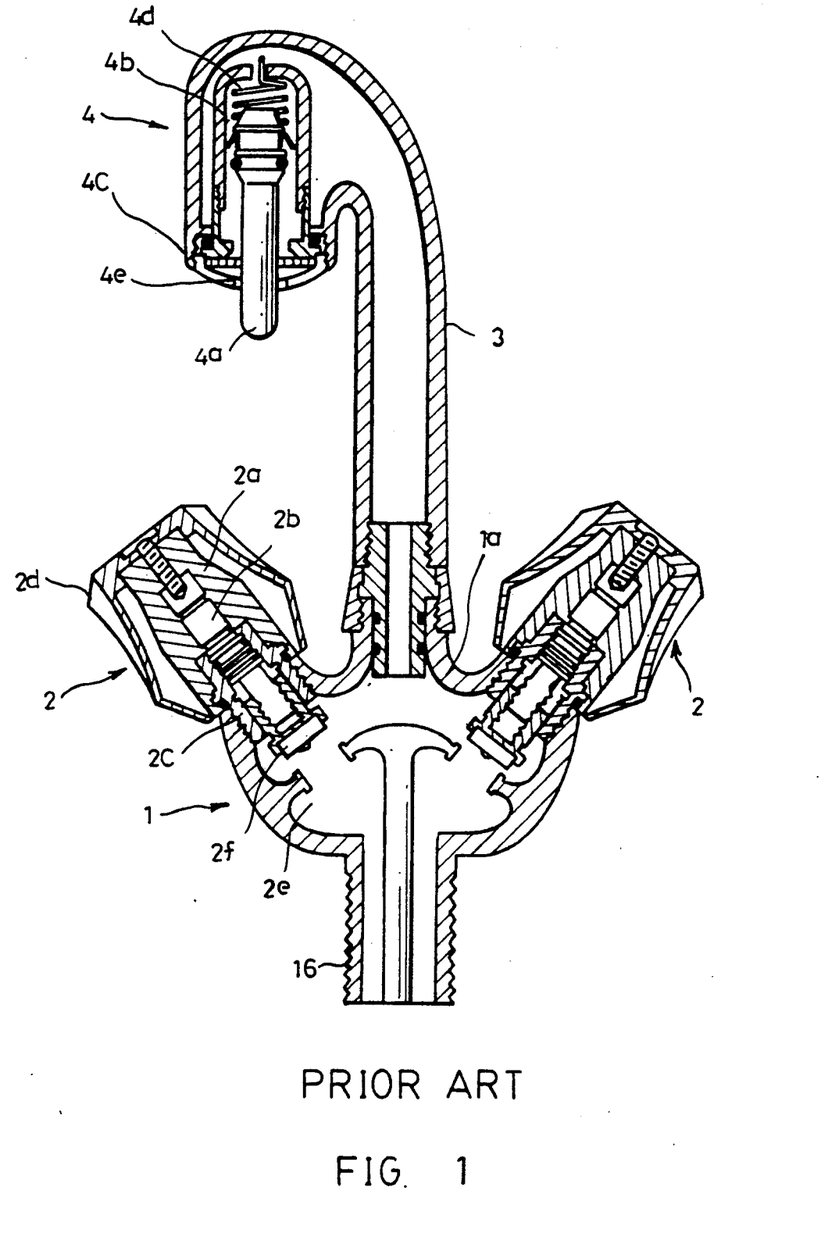
FIG. 1 is a sectional plan view of a water faucet structure of the prior art with a self-shutting egress valve thereof in an open position.

Referring to FIG. 1, a presettable water mixing faucet of the prior art is depicted comprising a housing 1, respective setting valves 2 and 2', a spout tube 3 connected to the water outlet 1a of housing 1, and a self-shutting egress valve 4 disposed in the free end of the spout tube 3.

Hot and cold water enters housing 1 through separate conduits in a combined water inlet 1b on a lower portion of the housing, and are combined in a mixing chamber 5 therein via setting valves 2 and 2'.

Each setting valve, 2 and 2', includes a positioning element 2a rotatably secured to an external position on housing 1, an attached shaft 2b, and a hollow valve piston 2c threadedly engaged with a tapped lower portion of shaft 2b. A turning knob 2d is secured over the positioning element to facilitate the rotation thereof and thereby effect axial displacement of valve piston 2c towards or away from a corresponding valve seat 2e formed within the housing. A valve washer 2f carried by valve piston 2c abuts the valve seat when the piston is at its maximum extension from shaft 2b to shut off the corresponding setting valve. Conversely, when piston 2c is in a fully retracted position the valve would be in a maximum flow setting.

By appropriate adjustments in valves 2 and 2' a mixture of hot and cold water of desired proportion will be formed in mixing chamber 5 for issuance through spout tube 3 when egress valve 4 is actuated.

The egress valve itself is of type including a sliding actuating plunger 4a disposed within a cup shaped cylinder 4b. The plunger acts as a valve piston and is biased towards a valve seat 4c provided below the cylinder by a spring 4d. The valve is operated by pushing plunger 4a upwards upon which water could then flow through a gap between an orifice 4e and the periphery thereof. Closure of the valve would be effected automatically by the fall of the plunger which, being viscously damped, would take several seconds.

Figure 2:
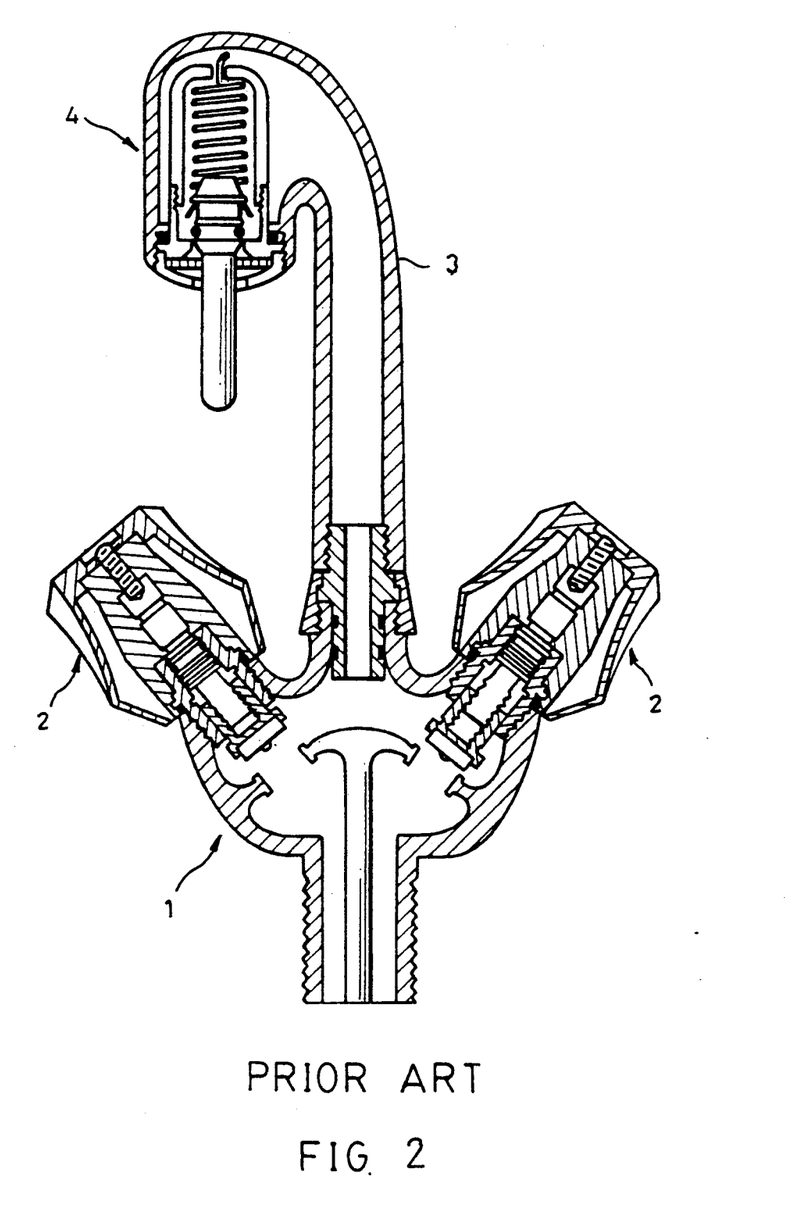
FIG. 2 is a sectional plan view of the prior art water faucet structure with the self-shutting egress valve thereof in a closed position.

Referring to FIG. 2, though this presettable mixing faucet structure can provide satisfactory results it does have a major deficiency in that with the egress valve in a closed position a backflow of water can occur between the hot water and cold water conduits as the setting valves are still in open positions, causing damage to the plumbing or heating system. Moreover, even if the hot and cold water lines were at substantially equal pressures an undesirable mixing of hot and cold water would result.

The mixing faucet of the present invention was accomplished to provide a faucet structure which prevents the backflow or premature mixing of hot and cold water therethrough while preserving all the functions and advantages of a more conventional presettable mixing faucet.

SUMMARY OF THE PRESENT INVENTION

The water faucet structure of the present invention has as a main object to provide a water faucet having a pair of setting valves for controlling the flow of hot and cold water and an egress valve through which can issue a mixture of hot and cold water of predetermined proportion as determined by the respective setting valves, with the operation of the setting valves preventing the backflow of water in the faucet.

In accordance therewith, a water faucet comprises a hollow housing having hot water and cold water inlets and a water outlet, a spout tube connected on one end to the water outlet and having an egress valve disposed in the other end thereof, and a pair of setting valves largely disposed in the housing.

The hot water inlet and cold water inlet are in communication with a mixing chamber formed in the housing via respective setting valves, in which selectable proportions of hot and cold water are combined for issuance through the spout tube.

Each setting valve includes a valve body, an elongate sliding element, a fixed retaining element, and a rotatable positioning element. The valve body has a piston and an elongate stem attached therewith on one end. The stem is slidingly retained within an axial cavity formed in a corresponding end of the sliding element which itself is slidingly engaged through a keyed hole formed in the retaining element, with the leveled sides of the sliding element preventing rotation therein. An opposite end of the sliding element has a threaded portion thereon engaged with an internally threaded cavity in the positioning element, by which rotation the sliding element is axially displaced.

The valve body is normally biased against a valve seat formed in the housing by a spring disposed between the piston and retaining element when the egress valve is in a closed position.

Opening of the egress valve would enable the flow of water through the respective setting valves forcing the valve pistons thereof outwards from their respective valve seats, with the sliding elements therein acting as selectably positionable stops for the pistons to control the rates of flow.

As the valve pistons would be urged against their respective valve seats when the egress valve is closed, the backflow of water from either inlet to the other would be inhibited.

For a more thorough understanding of the water faucet structure of the present invention a detailed description of a preferred embodiment which should be construed as exemplary rather than limitative thereof is provided below along with referential drawings.

DETAILED DESCRIPTION OF THE PREFERRED EMBODIMENT

Figure 3:
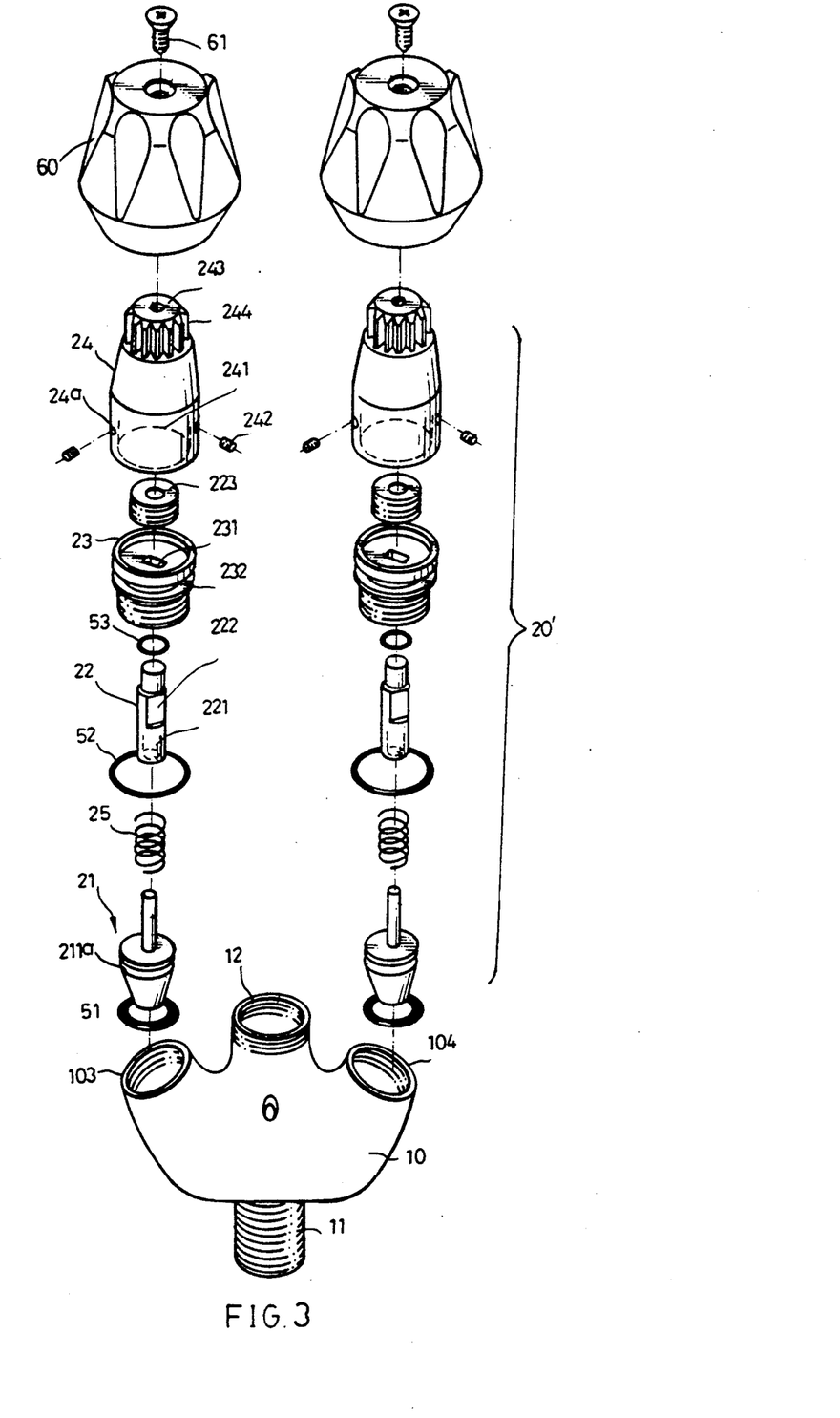
FIG. 3 is an exploded perspective view of the water faucet structure of the present invention according to a preferred embodiment thereof.
Figure 4:
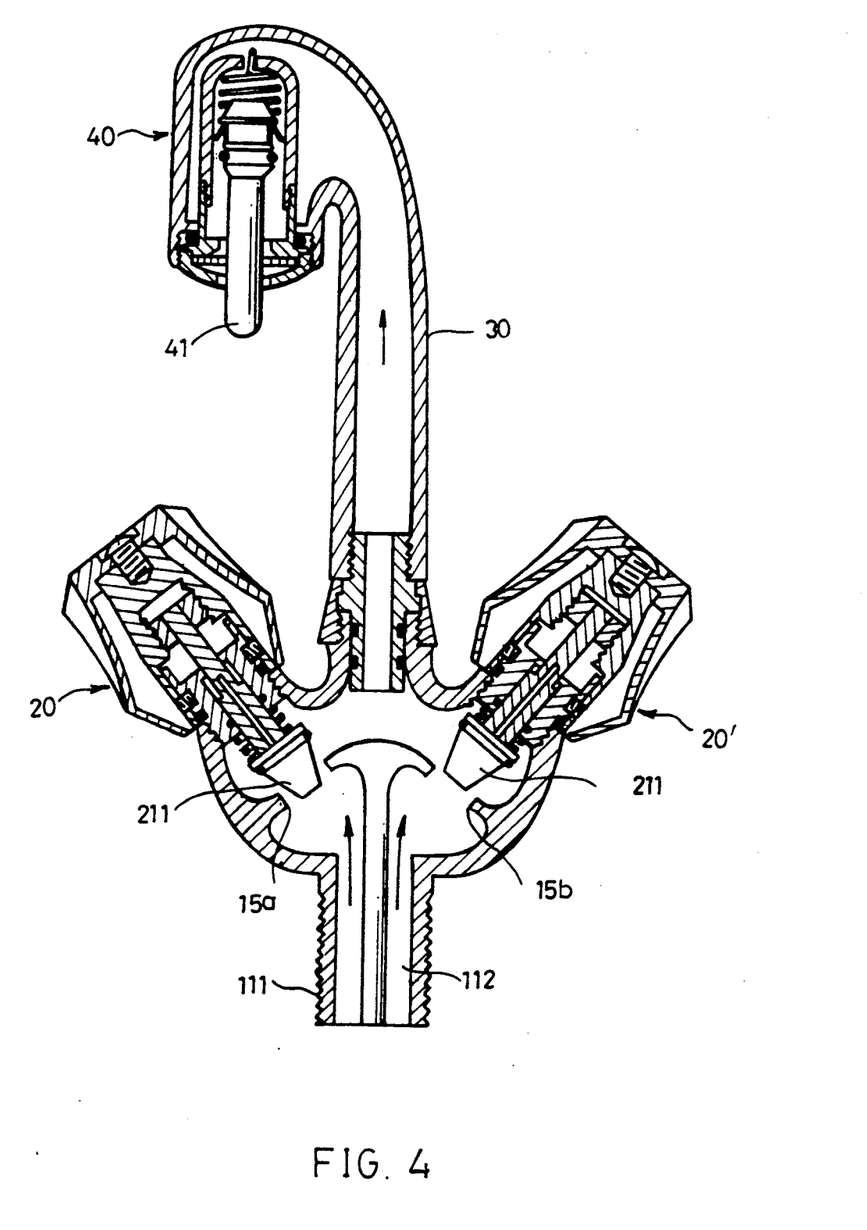
FIG. 4 is a sectional plan view of the water faucet of the present invention with the egress valve thereof in an open position.

Referring to FIGS. 3 and 4, a preferred embodiment of the water faucet structure of the present invention comprises a roughly cardioid shaped housing 10, a combined hot and cold water inlet 11 and a water outlet 12, a pair of setting valves 20 and 20', and a generally U-shaped spout tube 30 with a self shutting egress valve 40 provided in one end thereof.

Hot and cold water enters housing 10 through separate conduits, 111 and 112, in inlet 11 which is divided by a partition 13 and are combined in predetermined proportion in a mixing chamber 14 provided within housing 10 via respective setting valves 20 and 20'.

The free end of spout tube 30 is threadedly connected to water outlet 12 so that egress valve 40 is in communication therewith.

Mixed water from chamber 14 could thus flow outwards from spout tube 30 upon manual actuation of egress valve 40.

Setting valves, 20 and 20', can be adjusted to control the flow of hot and cold water into mixing chamber 14 while also preventing the backflow of water therethrough when egress valve 40 is in a closed position.

Each setting valve, 20 and 20', includes a valve body 21, a sliding element 22, a fixed retaining element 23, and a rotating positioning element 24.

Valve body 21 itself comprises a valve piston 211 having the shape of a frustum of a cone, and an elongate stem 212 with one end thereof secured to the larger diameter face of piston 211.

A pair of valve seats, 15a and 15b, are defined within housing 10 between adjutments, 101 and 102, therein and respective flared sides of a terminal portion 131 of partition 13, with pistons 211 of respective valves, 20 and 20', abutting thereagainst to restrict the flow of water therethrough.

An elastic O-ring 51 is disposed within a peripheral groove 211a formed around the larger diameter end of piston 211 to effect a better seal with a corresponding valve seat.

Sliding element 22 has an axial cavity 221 formed in one end thereof and a leveled central section 222 adapted to be received within a keyed hole 231 in retaining element 23 which is threadedly secured to a corresponding opening, 103 or 104, on housing 10. A similar O-ring seal 52 disposed between retaining element 23 and its corresponding opening prevents the leakage of water therebetween.

Sliding element 22 is thus slidingly engaged within retaining element 23 with rotation therein being inhibited.

Positioning element 24 is rotatingly secured over retaining element 23 and has an internally threaded cavity 241 with a threaded plug 223, secured to an opposite end of sliding element 22, engaged therein.

Securement of positioning element 24 is accomplished with a set of threaded pins 242 which pass through threaded holes 24a formed around the circumference thereof and project radially inwards to engage an annular guide groove 232 formed around the periphery of retaining element 23.

Rotation of positioning element 24 would thus effect the axial displacement of sliding element 21 in retaining element 23 which is facilitated by a turning knob 60 secured thereover. A screw 61 and fluted inner cavity (not shown) in knob 60 engage a corresponding securing hole 243 and splined boss 244 on positioning element 24 to effect the securement therebetween.

Stem 212 of valve body 21 is slidingly positioned within the axial cavity 221 of sliding element 21, with valve body 21 being biased towards a corresponding valve seat by a compression spring 25 disposed between retaining element 23 and the larger diameter face of valve piston 211.

An O-ring 53 disposed in an annular groove within axial cavity 221 prevents the seepage of water past stem 212.

In operation, the water faucet structure would be connected to a hot and cold water supply via inlet 11 which has a threaded lower portion for coupling therewith.

Setting valves, 20 and 20', could then be adjusted by rotating respective knobs 60 thereon, with egress valve 40 in either a closed or open position, to control the proportion of hot and cold water for issuance.

Rotation of knobs 60 on each valve, 20 and 20', comcomitantly effects the axial displacement of the sliding elements 22 therein relative to corresponding valve pistons 211 so as to establish a selectable separation therebetween, as shown in FIG. 4.

With an actuating plunger 41 of egress valve 40 in a lowered position and blocking the issuance of water therefrom, the pressure differential between opposing faces of each valve piston 211, i.e. the pressure difference between mixing chamber 14 and respective conduits 111 and 112, would be either substantially nil or positive on the side of mixing chamber 14 which in either case would result in pistons 211 being urged against respective valve seats, 15a and 15b, under the biasing action of spring 25.

Backflow of water from conduit 111 and 112 or vice versa would thus be inhibited.

Figure 5:
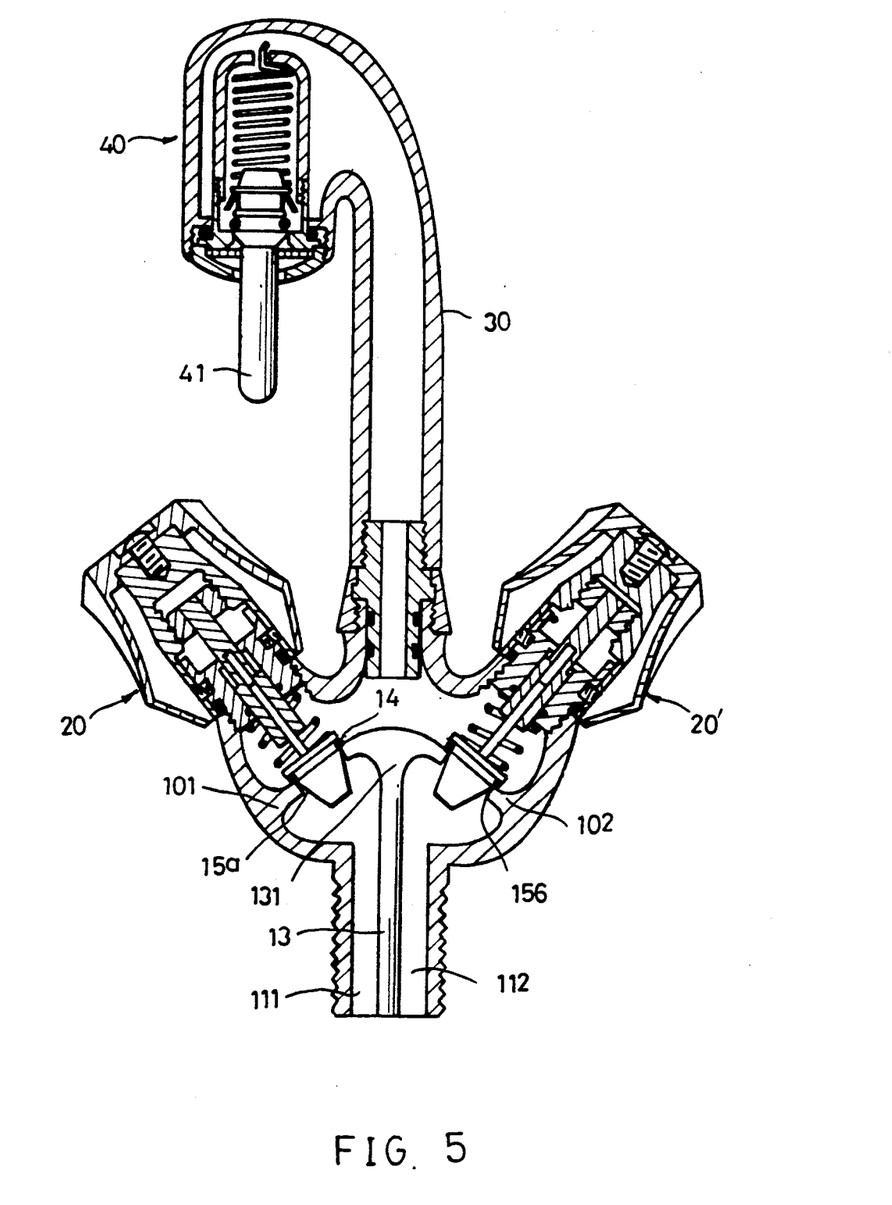
FIG. 5 is a sectional plan view of the water faucet of the present invention with the egress valve thereof in a closed position.
Figure 6:
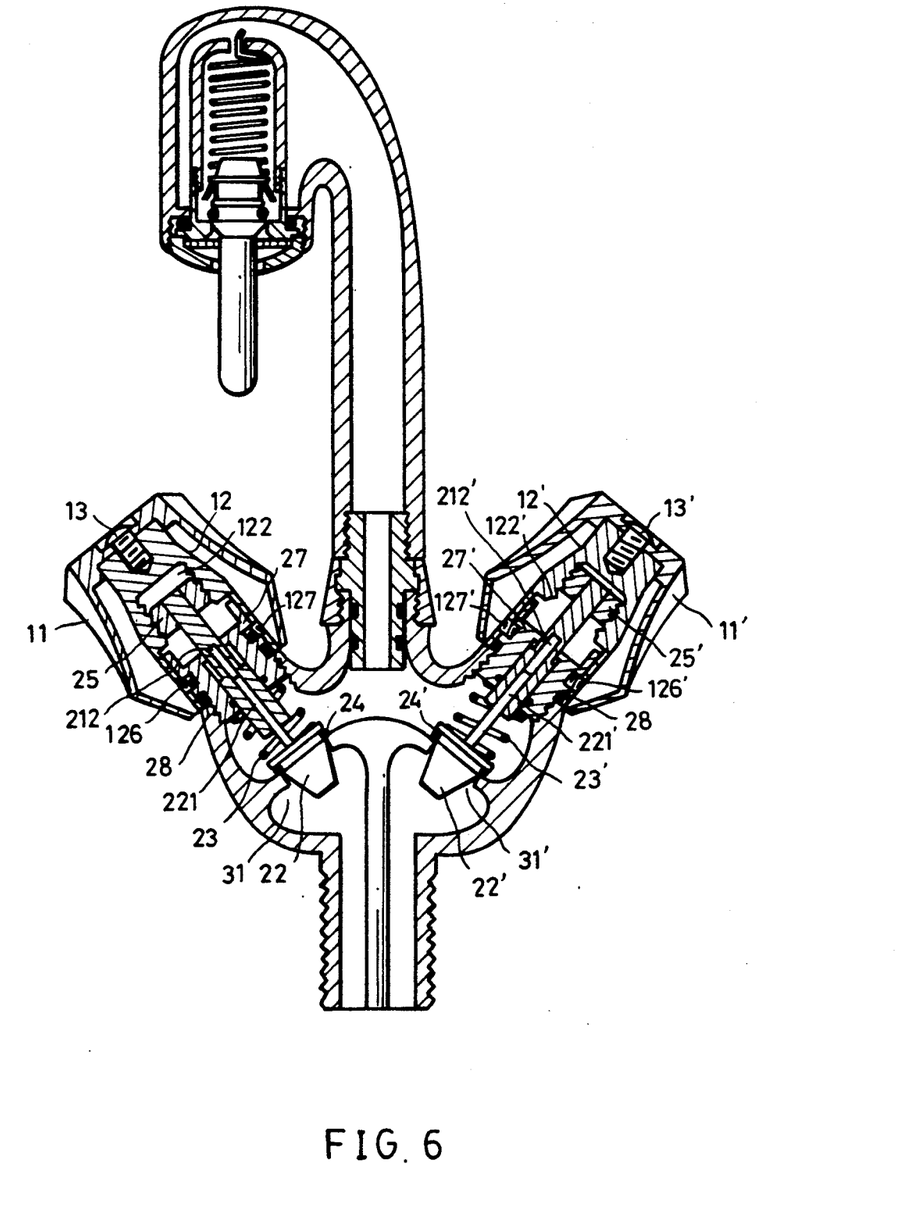
Figure 7:
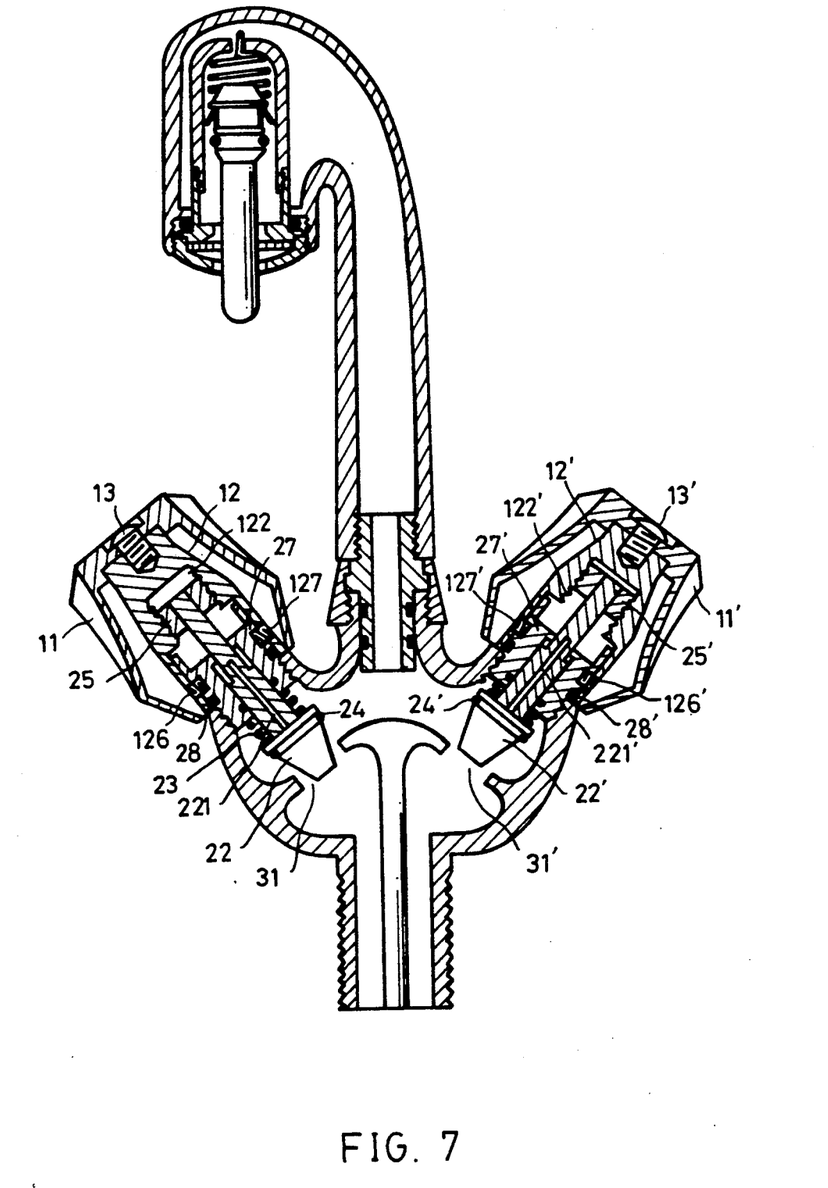

Referring to FIG. 5, when egress valve 40 is brought to an open position by pushing actuating plunger 41 upwards, the drop in pressure in spout 30 and mixing chamber 14 would enable the opening of valves 20 and 20'.

Pressurized water in conduits 111 and 112 would displace corresponding pistons 211 away from their valve seats and towards respective sliding elements 22, traversing the selected separation therebetween. In doing so, an equivalent separation would be defined between each piston 211 and its corresponding valve seat with the flow of water therethrough being controlled accordingly.

The desired proportions of hot and cold water would thereby be combined in mixing chamber 14 prior to issuance from the open egress valve 40.

As it is apparent that many variations and modifications could be made to the water faucet structure of the present invention by a person of average skill in the art, the spirit and scope of the present invention should not be construed from the specificities of the preferred embodiment as described above or depicted in the drawings but as determined by the appended claims and their legal equivalents.

I claim:

1. A structure of a water faucet comprising:
   a) a hollow housing having a mixing chamber provided therein and a water outlet in communication with said mixing chamber;
   b) a spout tube having a first end thereof connected to said water outlet;
   c) an egress valve provided on a second end of said spout tube and in communication with said water outlet through said spout tube;
   d) a hot water inlet and a cold water inlet provided in said hollow housing;
   e) a first valve means and a second valve means for controlling the flow of water through said hot water inlet and said cold water inlet respectively, with said hot water inlet and said cold water inlet being in communication with said mixing chamber via respective said first and second valve means, said first valve means and said second valve means each including;
      i) a valve seat provided within said housing in a fixed position therein;
      ii) a valve body having an elongate stem and a valve piston provided on one end thereof, said piston cooperating with said valve seat to restrict the flow of water through the corresponding said valve means;
      iii) a retaining element disposed in a fixed position in said housing and having a keyed hole formed therethrough;
      iv) an elongate sliding element having an axial cavity formed in one end thereof and a threaded portion formed on the opposite end thereof, said sliding element being slidingly positioned within said keyed hole of said retaining element with mating surfaces on said sliding element engaging the sides of said keyed hole to prevent the rotation of said sliding element therein, and said stem of said valve being slidingly positioned within said axial cavity of said sliding element;
      v) a positioning element having an internally threaded cavity formed therein and engaging said threaded portion of said stem, said positioning element being rotatably secured in a fixed position relative to said housing and having at least a portion thereof accessibly disposed to the exterior of said housing to enable the manual rotation thereof;
      vi) a compression spring disposed between said retaining element and said valve piston,
   biasing said valve body towards said valve seat.

2. A structure of a water faucet according to claim 1, wherein said retaining elements of said first and second valve means are threadedly secured to respective openings formed on said housing by means of mating threaded portions provided on said retaining elements and said openings.

3. A structure of a water faucet according to claim 2, wherein said positioning element is rotatably secured to said retaining element by means of a plurality of threaded pins threadedly positioned through respective holes formed at radial positions on said positioning element, and protruding radially inwards to engage a recessed circumferential groove formed around said retaining means.

4. A structure of a water faucet according to claim 3, further comprising a handle fixedly secured to the upper portion of said positioning element by means of a threaded fastener passing through a hole in said handle and securing to a threaded receiving hole in said positioning element, and a fluted inner cavity formed in said handle engaged with cooperating surfaces formed on said positioning element.

5. A structure of a water faucet according to claim 4, wherein said valve piston of said first and second valve means has the shape of a frustum of a cone.

6. A structure of a water faucet according to claim 5, wherein a first O ring seal is disposed around each said valve piston in an annular groove formed around the tapered circumferential side thereof, a second O ring seal is disposed between each said retaining element and a corresponding said opening on said housing, and a third O ring seal is disposed in an annular groove formed around the inner periphery of said axial cavity in each said sliding element.

7. A structure of a water faucet according to claim 6, wherein said hot water inlet and said cold water inlet are respective conduits defined within a single combined inlet by a dividing partition, said combined inlet having a threaded lower portion for coupling with a hot water and cold water supply.

* * * * *